(No Model.)  3 Sheets—Sheet 1.
C. H. KAHLER.
CASH INDICATOR AND REGISTER.
No. 397,554.  Patented Feb. 12, 1889.
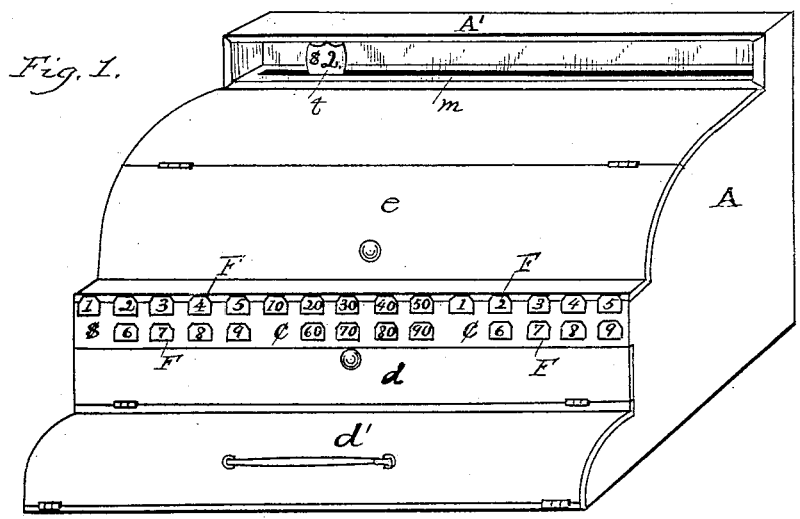
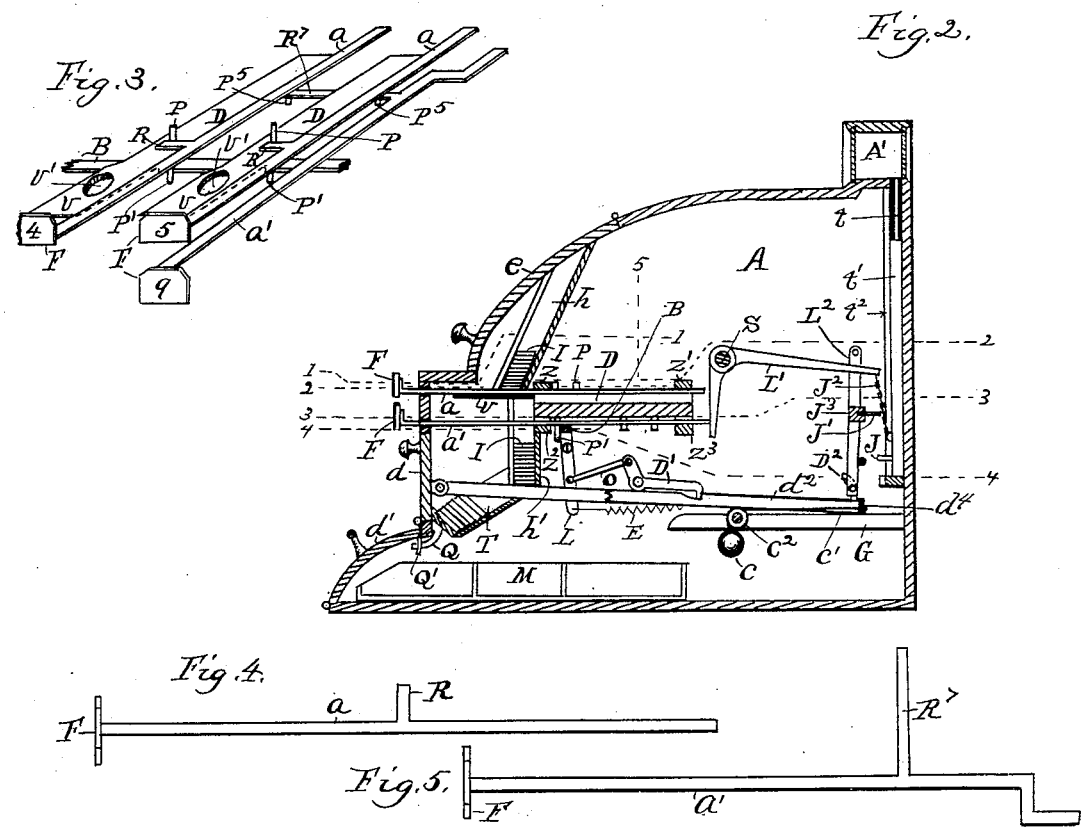
Witnesses.
Wm. J. Hutchins
K. C. Hutchins
Inventor.
Clarence H. Kahler,
By Thos. H. Hutchins
Atty.

(No Model.) 3 Sheets—Sheet 2.

C. H. KAHLER.
CASH INDICATOR AND REGISTER.

No. 397,554. Patented Feb. 12, 1889.

Witnesses.
Wm J Hutchins
K. E. Hutchins

Inventor.
Clarence H Kahler.
By Thos H Hutchins
Atty (No Model.) 3 Sheets—Sheet 3.
C. H. KAHLER.
CASH INDICATOR AND REGISTER.
No. 397,554. Patented Feb. 12, 1889.
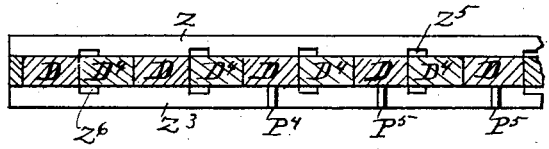
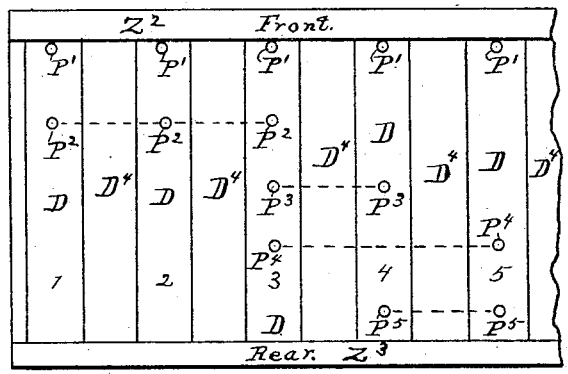
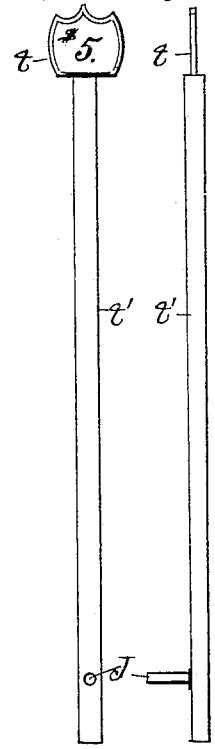
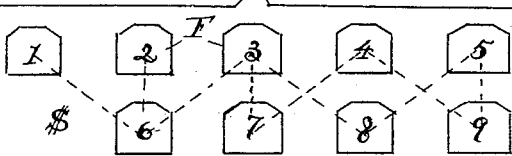
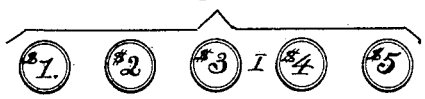
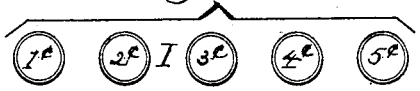
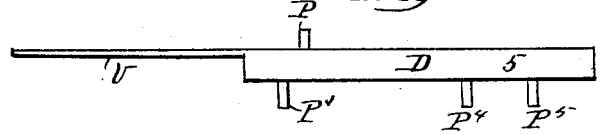
Witnesses
Wm. J. Hutchins.
K. C. Hutchins.
Inventor.
Clarence H. Kahler.
By Thos. H. Hutchins
Atty.

UNITED STATES PATENT OFFICE.

CLARENCE H. KAHLER, OF WILMINGTON, ILLINOIS.

CASH INDICATOR AND REGISTER.

SPECIFICATION forming part of Letters Patent No. 397,554, dated February 12, 1889.

Application filed March 10, 1888. Serial No. 266,876. (No model.)

*To all whom it may concern:*

Be it known that I, CLARENCE H. KAHLER, a citizen of the United States of America, residing at Wilmington, in the county of Will and State of Illinois, have invented certain new and useful Improvements in Cash-Registers, of which the following is a specification, reference being had therein to the accompanying drawings.

This invention relates to certain improvements in cash-registers, which improvements are fully set forth and explained in the following specification and claims, reference being had to the accompanying drawings, and the letters and figures of reference thereon, making a part of this specification, like letters of reference referring to like parts in the several views, and in which drawings—

Figure 6:
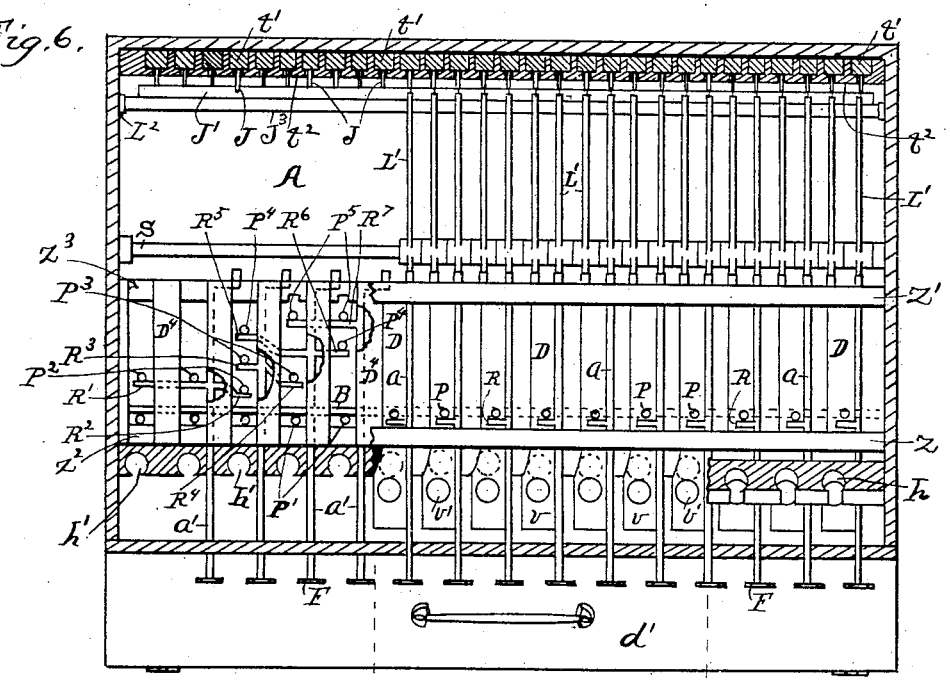
Figure 7:
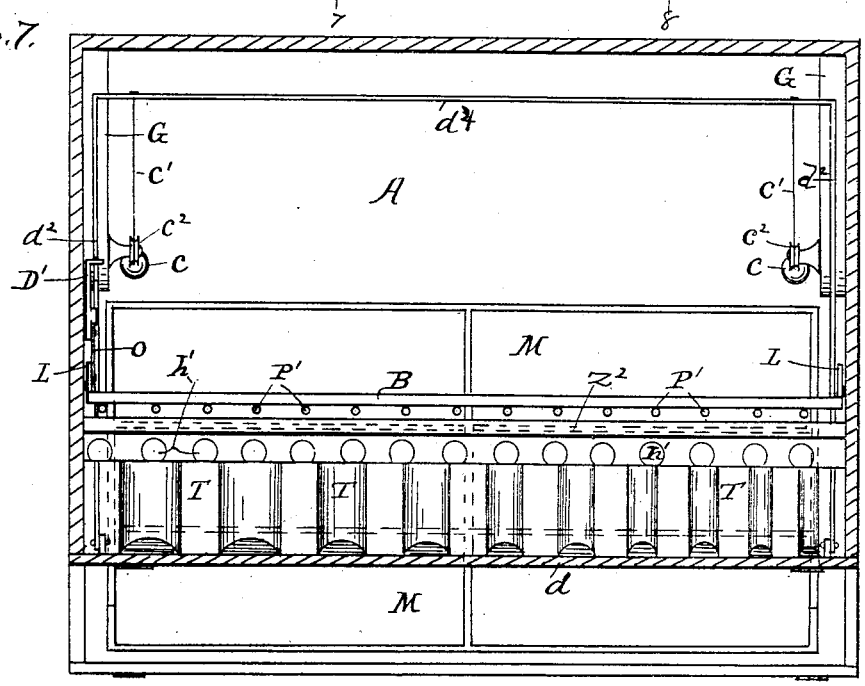

Figure 1 is a perspective view of the exterior case of the device to show its form. Fig. 2 is a vertical cross-sectional view of the device at the side of one of the key-slides and parts operated by it. Fig. 3 is a detail perspective view of three of the key-slides and two of the register-slides of the device. Fig. 4 is a plan view of one of the upper key-slides. Fig. 5 is a plan view of one of the lower key-slides. Fig. 6 is a horizontal sectional view on line 1 of Fig. 2 from dotted line 8 of said Fig. 6 to the right, and on line 2 of Fig. 2 between dotted lines 7 and 8 of Fig. 6, and on line 3 of Fig. 2 from dotted line 7 to the left of Fig. 6, looking down in each case. Fig. 7 is a horizontal sectional view of Fig. 2 on line 4. Fig. 8 is a cross-sectional view of a section of the registering-slides and their supporting-frame on line 5 of Fig. 2, looking rearward. Fig. 9 is a bottom plan view of a section of the register-slides and their supporting-frame. Fig. 10 is a face plan view of a section of the key-slides. Fig. 11 is a face plan view of one of the tablet-rods and its indicating-tablet. Fig. 12 is a side view of the same. Figs. 13, 14, and 15 are plan views of the tally-checks, and Fig. 16 is a side view of one of the register-slides.

This device is intended for use in stores, counting-rooms, &c., for the purpose of registering cash received for sales through the medium of tally-checks having numbers or characters representing and corresponding with the amount of cash deposited in the cash-receptacle, and its construction is such that when the operator deposits an amount of cash in its tills he may operate key-slides having numbers corresponding to the cash deposited and deposit tally-checks having corresponding numbers with the cash and keys in proper receptacles. At the close of a day the aggregate numbers on the deposited tally-checks should correspond with the cash in the tills. If they do not correspond, it is evident a mistake has been made.

Referring to the drawings for detail of construction and operation, A represents the exterior case of the device, having the doors $e \, d \, d'$. Door $d$ has hinged to its rear side the bars $d^2$—one at either end—which bars are connected at their rear ends by means of the cross-bar $d^4$, and rest at that end on the guides G, secured to the case A, upon which they slide.

$C' \, C'$ are cords secured at one end to the cross-bar $d^4$ and to weights C at their opposite end, and pass over pulleys $C^2$ for the purpose of quickly carrying the bars $d^2$ and cross-bar $d^4$ forward when released from the detent-dog $D'$ for the purpose of opening the door $d$ and tripping a detent-bar, $J^3$, to drop any of the series of tablet-rods that have been previously elevated by the key-slides.

A longitudinal frame consisting of the bars Z $Z'$ $Z^2$ $Z^3$ supports a double row of transversely-arranged key-slides, $a$ and $a'$, and a row of register-slides, D, operated by said key-slides; and $D^4$ are a series of division cross-bars arranged between said register-slides to separate them from each other, and together with the bars Z $Z'$ $Z^2$ $Z^3$ form the supporting-frame of said slides. Figs. 2, 6, 8, and 9 show the construction of said frame and the arrangement of the key and register slides therewith.

The key-slides are arranged in two horizontal rows, one immediately above the other. The upper row of key-slides is located in the notches $Z^5$, formed in the bars Z $Z'$, and the lower row of key-slides is located in the notches $Z^6$, formed in the lower cross-bars or frame, $Z^2 \, Z^3$. (See Figs. 2 and 8.) These key-slides extend forward outside the case A, and are provided with push-keys F, each having a figure or figures denoting dollars or cents.

The key-slides are arranged in three sections, as shown particularly in Fig. 1, the section to the left comprising nine keys, both upper and lower having figures representing dollars from one to nine, both inclusive, the central section comprising nine keys, both upper and lower, having figures representing cents from ten to ninety, both inclusive, and the section to the right comprising nine keys, both upper and lower, having figures representing cents from one to nine, both inclusive. The key-slides are each provided with laterally-extending arms, such as are shown at R R' R$^2$ R$^3$ R$^4$ R$^5$ R$^6$ R$^7$. These arms engage pins set in the register-slides D, so that the key-slides will carry the register-slides backward with them when the push-keys F are pushed in, the upper key-slides engaging pins P on the upper side of the register-slides and the lower key-slides engaging combination-pins P$^2$ P$^3$ P$^4$ P$^5$ on the lower side of the register-slides. Each register-slide is provided on its under side with a pin, P', arranged to separately engage the forward side of the yielding bar B. This bar B terminates at either end in depending levers L, pivoted near their upper ends to the inner walls of the case and secured at their lower ends to coil-springs E, secured to the inner walls of the case for the purpose of yieldingly holding said bar B forward against pins P' of the register-slides D, to return them and the key-slides after having been pushed backward by the operator.

D' D' is a detent-dog pivotally secured to the inner walls of the case and connected by means of link O with levers L, and may be in duplicate at either end of bar B. These dogs operate in detent-notches in the upper side of the bars d$^2$ of door d for the purpose of holding said bars and bar d$^4$ backward and the door d closed. The forward-extending part V of each register-slide is provided with an aperture, V', for holding a tally-check, I, such as is shown in Figs. 2, 13, 14, and 15. The said register-slides are reduced in size at that part to be of a thickness corresponding with said checks I.

Tally-check receptacles h are arranged one immediately over each register-slide, so they will register with the apertures V' when said slides are forward and deposit a tally-check in each of said apertures. h' are tally-check receptacles arranged one under each register-slide, but to the rearward of receptacles h above, and so that they will register with apertures V' of said slides when they are moved back and receive the tally-checks therefrom, so that the reciprocation of the register-slides is for the purpose of depositing tally-checks from receptacles h in receptacles h' corresponding with the cash deposited in the tills. The rear ends of the key-slides extend beyond their supporting-frame and independently engage the depending arm of one of a series of bell-cranks, L', pivotally arranged on the longitudinal shaft S at the rear of said slides, as shown in Figs. 2 and 6, the lower row of key-slides, a', being offset laterally at their rear ends to engage a bell-crank between two adjacent key-slides, a. (See Figs. 3, 5, and 6.) The opposite arms of the bell-cranks L are independently connected with one of a series of vertically-arranged tablet-rods, t', through the medium of a short cord or chain, J$^2$. These tablet-rods t' are arranged between guides t$^2$, and are provided at their upper end with indicating-tablets t, having numbers corresponding with those of the push-keys F of the key-slides by which they are operated and with the tally-checks deposited by said register-slides operated by said key-slides. When a key-slide is pushed in, its rear extending end will engage the depending arm of its respective bell-crank located immediately in line with and behind it and cause it to operate and elevate a tablet-rod, so its tablet will be exposed to view in the upper part of the case at A', as shown in Fig. 1, so it can be seen by both operator and customer, the sides of said part A' of the case being glass, so as to permit such view. These tablet-rods are each provided with a detent-pin near their lower ends for resting on a rubber detent-strip secured to the cross-bar J$^3$. The force exerted on the tablet-rod by the bell-crank to raise it will carry pin J above said rubber detent-strip, which is of sufficient tension to hold said tablet-rod elevated until the bar J$^3$ is moved forward to release said detent-strip from under said pins J and permit the tablet-rods to drop. The lower ends of the arms L$^2$, to which the detent-bar J$^3$ is secured, are provided with gravity-dogs D$^2$ for engaging cross-bar d$^4$, so that the lower end of said arms may be tripped or carried slightly forward by said bar as it is moved forward by weights C whenever released from the detent-dogs D', and so that when said bar returns by closing of door d it may pass under said arms, operating the gravity-dogs D$^2$ and not said arms L$^2$ and detent-bar J$^3$. The movement thus given arms L$^2$ and their detent-bar J$^3$ is quick and slight, only moving just sufficient to cause the pins J of the tablet-rods to be released from the rubber detent-strip J', when said detent-strip immediately resumes its position, as shown. The lower key-slides of each section move two or more of the register-slides of that section for the purpose of causing them to drop tally-checks in their proper receptacles whose aggregate numbers correspond with the numbers of the keys by which they were operated, and which key will operate a bell-crank and indicating-tablet rod and expose it to view, having a number corresponding with that of the key by which it was operated and also the aggregate of the numbers of the tally-checks dropped in their proper receptacles.

In Fig. 3 it is illustrated how this is accomplished. Said figure represents three of the key-slides and two of the register-slides of the left-hand section, hereinbefore mentioned.

By pushing in the lower key-slide having 9 on its key F said slide will, through the medium of its arm R⁷ engaging with the combination-pins P⁵ on the under side of the register-slides D, carry said register-slides backward and cause them to drop tally-checks having characters, respectively, $4 and $5, corresponding with the number of the push-keys F over which their register-slides are located, the aggregate of said numbers being nine, the number on the lower key by which the said tally-checks were dropped. This would indicate nine dollars had been received and placed in the till, and tally-checks indicating nine dollars had been dropped in their proper receptacles, (four in one and five in the other.)

If it were desired to register the amount denoted on any one of the upper row of keys, that key would be pushed in, and if it were desired to register the amount denoted on any one of the lower row of keys that key would be pushed in and register a combination of numbers of that section aggregating those on the key.

In making connections with the proper register-slides in each section of each consecutive five of said register-slides to make combinations of the representative amount of two or more of said register-slides to aggregate another amount by means of pushing in the lower key-slides the construction and arrangement are as follows:

In registering six dollars the combination consists of register-slides which deposit tally-checks representing one dollar, two dollars, and three dollars, (see Figs. 9 and 10,) aggregating six dollars, and the said lower key-slide has laterally-extending arms R' and R², (see Fig. 6,) which engage pins P² on the under side of said three register-slides, carrying said register-slides backward whenever said key-slide is pushed in. In like manner the seven-dollar key-slide has laterally-extending arms R³ and R⁴, which engage the combination-pins P³ of the three-dollar and four-dollar register-slides, which two amounts aggregate seven dollars. In like manner the eight-dollar key-slide has laterally-extending arms R⁵ and R⁶, which engage the combination-pins P⁴ of the three-dollar and five-dollar register-slides, which two amounts aggregate eight dollars, and the nine-dollar combination, being made as heretofore stated. Should a higher denomination than those illustrated be desired, another duplicate section consisting of five register-slides and nine key-slides, with operating mechanism having characters or figures denoting dollars from ten dollars to ninety dollars, or even two or more sections, can be added to the device having figures denoting any desired amount, which additions would simply be duplicate sections of that shown in their mechanical construction, and thus by regarding the number of sections used the device can be made in any desired size to accommodate the purposes required. The door $d'$ is locked when the door $d$ is closed by means of the curved bolt Q of said door $d$ entering loop Q' of door $d'$, as shown in Fig. 2.

The door $e$ is for the purpose of access to the receptacles $h$, and the doors $d$ and $d'$ for access to the money-tills T and M. The tills T are for holding coin, and the tills M are for holding currency, &c.

In operation, the receptacles $h$ having been previously filled with their proper tally-checks, one of the keys is pushed in and the lateral-extending arm of its slide will carry with it a register-slide, the lower pin, P', of which carries the cross-bar B with it, causing the detent-dogs D' to be operated and release the bars $d^2$, when the weights C will instantly cause said bars $d^2$ and bar $d^4$ to move forward, opening the door $d$ and tripping the lower ends of arms L³, so as to cause the tablet-rods $t'$ and their indicating-tablets that may be left elevated and resting on detent-strip J' to drop. Instantly following such operation the proper register-slide will deposit its proper tally-check, and through the medium of a bell-crank operated by the key-slide elevate a tablet-rod to expose to view its indicating-tablet, and supported by the detent-strip J³, which has returned immediately after being tripped, as aforesaid. As soon as the door $d$ opens, as stated, and the cash is deposited in its proper till and the proper keys operated, as aforesaid, to drop the proper tally-checks in their proper receptacles and expose to view the proper indicating-tablets for the inspection of the operator and customer, the doors are all closed, and the tablet-checks are left standing until door $d$ is again opened, with the same result as before stated.

If desired, the bell-cranks may for the purpose of economizing space and reducing the size of the outer case be located immediately above the slides and be connected, respectively, to the said slides by means of cords or chains in the same manner as the bell-cranks are attached to the tablet-rods.

Having thus described my invention, what I claim as new, and desire to secure by Letters Patent, is as follows, to wit:

1. In the cash-register shown and described, the combination of the key-slides $a\ a'$, register-slides D, having apertures V', the means shown for connecting said slides, the tally-check receptacles $h\ h'$, adapted to register with said apertures, and the means for returning said slides after being pushed in, substantially as and for the purpose set forth.

2. In the cash-register shown and described, the combination of the key-slides $a\ a'$, having laterally-extending arms and numbered keys, the register-slides D, having apertures V' and pins on both upper and lower sides for being engaged by said arms, the tally-check receptacles $h\ h'$, arranged to register with the apertures V' of said register-slides, bell-cranks L', tablet-rods $t^2$, having indicating-tablets $t$ on their upper end and having the detent-pins J, swinging detent-bar J³, and detent-strip J', arm L³, having the gravity-dogs $D^2$, arms $d^2$, bar $d^4$, cord $C'$, and weight $C$, door $d$, dogs $D'$, links $O$, levers $L$, springs $E$, and yielding cross-bar $B$, substantially as and for the purpose set forth.

3. In the cash-register shown and described, the combination of the key-slides $a\ a'$, register-slides $D$, having the pins $P'$, yielding bar $B$, levers $L$, coil-springs $E$, links $O$, detent-dogs $D'$, arms $d^2$, cross-bar $d^4$, arms $L^2$, detent-bar $J^3$, detent-strip $J'$, weight $C$, and cord $C'$, substantially as and for the purpose set forth.

4. In the cash-register shown and described, in combination with the key-slides $a\ a'$, register-slides $D$, having the pins $P'$, bell-cranks $L'$, cords or chains $J^2$, and tablet-rods $t^2$, having the indicating-tablets $t$, and the means shown and described for holding supported said tablet-rods and tablets, substantially as and for the purpose set forth.

5. In the cash-register shown and described, having its key and register slides arranged in separate numerical sections, as specified, the combination, in any one of said sections, of a key-slide having its key provided with denominational characters or numbers, and having laterally-extending arm or arms, and two or more register-slides of said section having combination pin or pins for engaging said arms in such manner that the register-slides operated by said key-slide will register tally-checks having numbers or characters the aggregate of which correspond with that of the key by which they are operated, substantially as and for the purpose set forth.

CLARENCE H. KAHLER.

Witnesses:
THOS. H. HUTCHINS,
WM. J. HUTCHINS.